United States Patent
Cahill

(10) Patent No.: US 8,280,603 B2
(45) Date of Patent: Oct. 2, 2012

(54) SYSTEM AND METHOD TO DETERMINE BRAKE PEDAL SENSOR FAILURE

(75) Inventor: Eric D. Cahill, Troy, OH (US)

(73) Assignee: Goodrich Corporation, Charlotte, NC (US)

( * ) Notice: Subject to any disclaimer, the term of this patent is extended or adjusted under 35 U.S.C. 154(b) by 536 days.

(21) Appl. No.: 12/400,139

(22) Filed: Mar. 9, 2009

(65) Prior Publication Data

US 2010/0228430 A1  Sep. 9, 2010

(51) Int. Cl.
*G06F 19/00* (2011.01)
(52) U.S. Cl. ...... 701/70; 188/266.8; 303/126; 714/47.1; 714/47.2; 714/49
(58) Field of Classification Search .............. 188/266.8; D12/14; 701/70; 303/126; 714/47.1, 47.2, 714/49
See application file for complete search history.

(56) References Cited

U.S. PATENT DOCUMENTS

| | | | | |
|---|---|---|---|---|
| 4,784,442 A | * | 11/1988 | Petersen | 303/15 |
| 5,136,510 A | * | 8/1992 | Beck | 701/70 |
| 5,833,327 A | * | 11/1998 | Kozakai | 303/113.4 |
| 6,134,956 A | * | 10/2000 | Salamat et al. | 73/121 |
| 6,183,051 B1 | * | 2/2001 | Hill et al. | 303/126 |
| 6,390,571 B1 | * | 5/2002 | Murphy | 303/126 |
| 6,513,885 B1 | * | 2/2003 | Salamat et al. | 303/122.09 |
| 7,524,000 B2 | * | 4/2009 | Yamamoto et al. | 303/126 |
| 7,963,620 B2 | * | 6/2011 | DeVlieg | 303/138 |
| 2001/0025220 A1 | * | 9/2001 | Kaneko et al. | 701/112 |
| 2001/0045771 A1 | * | 11/2001 | Corio et al. | 303/20 |
| 2005/0288843 A1 | * | 12/2005 | Lindqvist | 701/70 |
| 2009/0099745 A1 | * | 4/2009 | Karnjate et al. | 701/70 |
| 2009/0240412 A1 | * | 9/2009 | Cahill | 701/70 |
| 2010/0057320 A1 | * | 3/2010 | Whittingham | 701/70 |

FOREIGN PATENT DOCUMENTS

| | | |
|---|---|---|
| EP | 2105364 | 9/2009 |
| WO | 2008/065335 | 6/2008 |
| WO | 2008/097260 | 8/2008 |
| WO | 2009/004474 | 1/2009 |

OTHER PUBLICATIONS

Patents Act 1977: Search Report under Section 17(5) dated Apr. 19, 2010.

* cited by examiner

*Primary Examiner* — Thomas Black
*Assistant Examiner* — Sara Lewandroski
(74) *Attorney, Agent, or Firm* — Snell & Wilmer L.L.P.

(57) ABSTRACT

Systems and methods for determining aircraft brake pedal sensor failure are provided. A brake pedal sensor and/or a brake pedal may be "failed" if brake pedal sensor readings unlikely to be generated as a result of human input are detected. The method comprises acquiring brake pedal measurements from a brake pedal sensor, determining a state of the brake pedal sensor, and providing a notification of the state. Each brake pedal measurement comprises a brake pedal deflection amount. The brake pedal sensor test algorithm may be conducted at regular intervals, in preparation for aircraft landing, at the request of a human operator, and the like.

14 Claims, 3 Drawing Sheets

SYSTEM AND METHOD TO DETERMINE BRAKE PEDAL SENSOR FAILURE

FIELD OF THE INVENTION

The present invention generally relates to brake pedals, and more particularly, to systems and methods for determining brake pedal sensor failure.

BACKGROUND

In a standard aircraft having a pilot and co-pilot, there are typically four brake pedals. Each of the pilot and co-pilot has two brake pedals. For the pilot, the left brake pedal controls the brakes on the left side of the aircraft, and the right brake pedal controls the brakes on the right side of the aircraft. The left and right brake pedals are configured similarly for the co-pilot.

Generally, as between the pilot's left brake pedal and the co-pilot's left brake pedal, the determination of which pedal is controlling the brakes on the left side of the aircraft is determined based upon which of the pilot's or co-pilot's respective left brake pedals is indicating the highest level of braking. Similarly, as between the pilot's right brake pedal and the co-pilot's right brake pedal, the determination of which pedal is controlling the brakes on the right side of the aircraft is determined based upon which of the pilot's or co-pilot's respective right brake pedals is indicating the highest level of braking.

Thus, if the pilot's left brake pedal is indicating a higher braking level than the co-pilot's left brake pedal, then the pilot's left brake pedal will control the brakes on the left side of the aircraft. However, if the co-pilot's left brake pedal is indicating a higher braking level than the pilot's left brake pedal, then the co-pilot's left brake pedal will control the brakes on the left side of the aircraft. The same considerations apply to the right side brake pedals and the brakes on the right side of the aircraft. Thus, in this regard, it is possible, though uncommon, that the pilot could be controlling the brakes on one side of the aircraft, while the co-pilot is controlling the brakes on the other side. It is therefore desirable to obtain reliable information (e.g., from at least one brake pedal sensor) regarding the current state of a brake pedal.

Additionally, each of the left and right brake pedals generally include at least one brake pedal sensor which conveys the amount of braking that the crew (e.g., pilot and/or co-pilot) desires, and this amount is communicated to other systems, for example to a brake control system of the aircraft. While it is important that the aircraft has functioning brakes, it is potentially catastrophic to have a braking level indicated by a sensor and/or the braking control system but which was not commanded by the crew. This is also known as uncommanded braking. Additionally, in the event of a brake pedal sensor malfunction, the aircraft's brakes likewise may not function as desired when needed.

Thus, systems and methods for proactively determining whether there is a failure or malfunction of one more brake pedal sensors so that the crew can take the most appropriate action are desired. For example, in the event of a sensor malfunction, systems and methods which "fail" the pedal and/or sensor, and thus ignore the braking indications from that pedal and/or sensor, are desired. Such systems and methods allow the crew to respond, for example to consider landing at a different runway/airport and/or ensure the use of non-fail brake pedals during landing.

Accordingly, a need exists for systems and methods for determining whether a brake pedal sensor is functioning properly.

SUMMARY

In an embodiment, a brake pedal sensor test system comprises a brake pedal sensor configured to measure a brake pedal deflection amount, and a control system in communication with the brake pedal sensor. The control system is configured to assess brake pedal measurements to determine the presence of a non-conforming input state. A notification system is in communication with the control system, and the notification system provides an indication responsive to the determination of the control system.

In an embodiment, the method for determining a state of a brake pedal sensor comprises receiving at least two brake pedal measurements from the brake pedal sensor, determining the state of the brake pedal sensor based upon at least two brake pedal measurements, and providing a notification of the state. Each brake pedal measurement comprises a brake pedal deflection amount.

DETAILED DESCRIPTION

Figure 1:
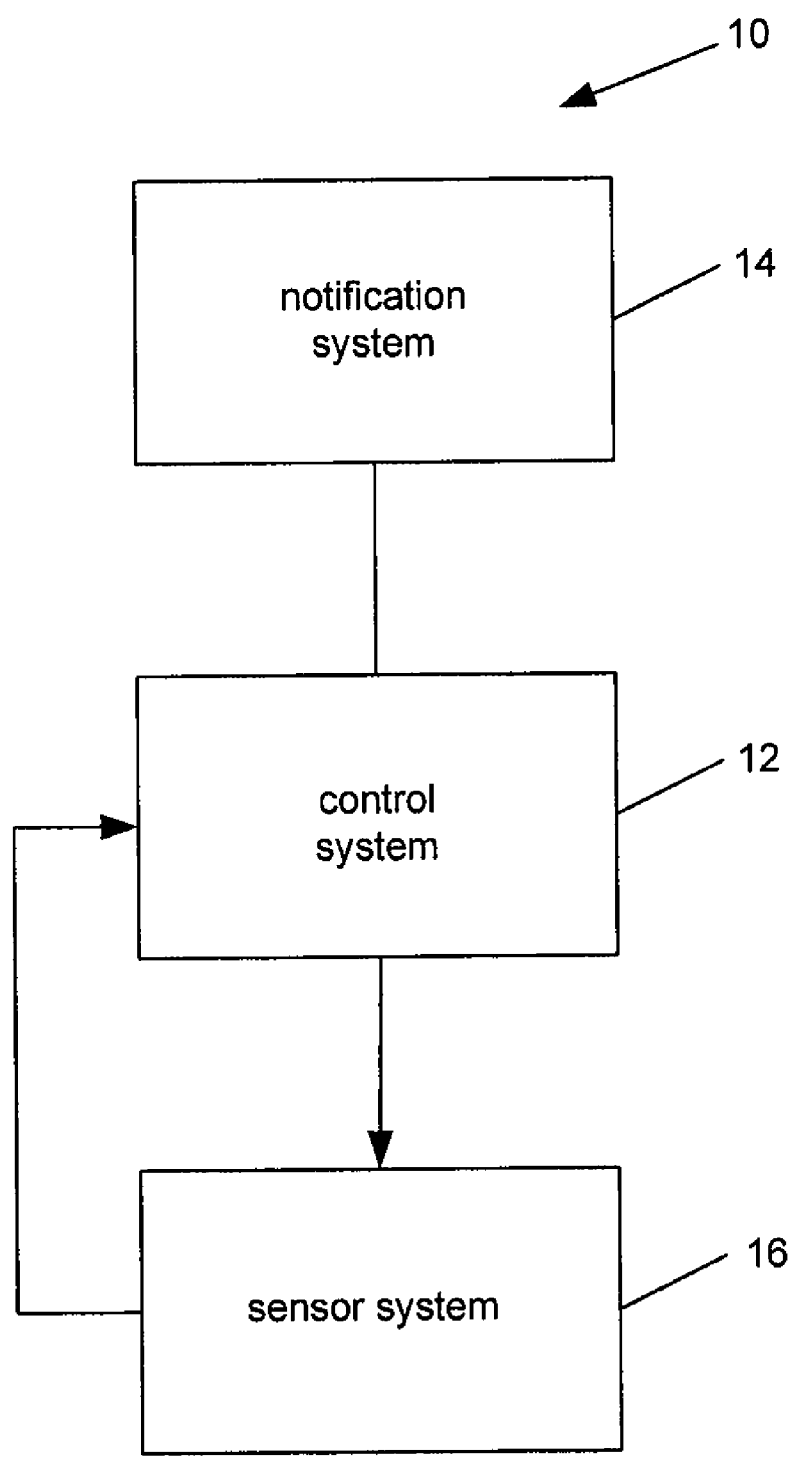
FIG. 1 illustrates a system block diagram in accordance with an embodiment.

The detailed description of exemplary embodiments herein makes reference to the accompanying drawings, which show exemplary embodiments by way of illustration and its best mode, and not of limitation. While these exemplary embodiments are described in sufficient detail to enable those skilled in the art to practice the invention, it should be understood that other embodiments may be realized and that logical, chemical, electrical, and mechanical changes may be made without departing from the spirit and scope of the invention. For example, the steps recited in any of the method or process descriptions may be executed in any order and are not necessarily limited to the order presented. Moreover, many of the functions or steps may be outsourced to or performed by one or more third parties. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment options. Additionally, any reference to without contact (or similar phrases) may also include reduced contact or minimal contact.

As noted above, in a standard aircraft having a pilot and co-pilot, there are typically four brake pedals. Each of the pilot and co-pilot has two brake pedals. For the pilot, the left brake pedal controls the brakes on the left side of the aircraft, and the right brake pedal controls the brakes on the right side of the aircraft. The left and right brakes are configured similarly for the co-pilot. As also noted above, the determination of which pedal is controlling the brakes on either side of the aircraft is determined based upon which of the pilot's or co-pilot's respective brake pedals are indicating the highest level of braking.

Each of the brake pedals generally include at least one brake pedal sensor, which measures and indicates at least a portion of a displacement (or "deflection") of the pedal in response to a force (e.g., applied by the pilot and/or co-pilot). A brake pedal control system may keep records of brake pedal sensor measurements, for example to calculate a time of displacement. As also noted above, it is important to ascertain whether the brake pedal sensors are functioning properly so that the pilot or co-pilot may take action, i.e., land with auto-brake, use emergency brakes, not use the brakes (land, then brake with reverse thrusters, instead of wheel braking), or simply be very cognizant of the situation so they can act appropriately.

In general, because aircraft brake pedals are configured to receive input from a human operator, measurements from a brake pedal displacement sensor, which may be interpreted to represent input received at a brake pedal, may be expected to represent "human-like" input. In other words, the displacement of a brake pedal may be expected to follow a pattern that a human body is capable of producing. In the event that one or more measurements from a brake pedal sensor indicate, for example, an aberrant pattern, a highly regular pattern, a rapidly oscillating pattern, a fixed state of extended duration, and the like, such non-human input characteristics may be an indication of a potential problem with a brake pedal, a brake pedal displacement sensor, a brake pedal control system, and/or other aircraft components. Moreover, one or more measurements from a brake pedal sensor may indicate input characteristics in excess of the mechanical capabilities of the brake pedal, and such input characteristics may likewise be an indication of a potential problem.

Accordingly, in an embodiment, brake pedal measurements are taken by a sensor system comprising one or more brake pedal sensors. The brake pedal measurements each comprise a brake pedal deflection amount. In an embodiment, the brake pedal measurements are communicated to a control system, and the control system uses a brake pedal sensor test algorithm to determine whether the current and/or recorded brake pedal measurements indicate that the brake pedal sensor is in a "fail" state.

A fail state indicates an error or other problem with the brake pedal sensor or that the sensor is not otherwise functioning properly. For example, a brake pedal sensor may be coupled to a spring in order to assist the sensor to return to a zero position. If a brake pedal sensor detaches from its mounting point on the brake pedal assembly (e.g., while the aircraft is flying), it may become lodged into the cockpit floor and erroneously indicate a braking command. Moreover, errors may be "common" to two or more brake pedal sensors. For example, because two or more brake pedal sensors may be contained within a shared housing or otherwise coupled to a brake pedal via a common connection, it is possible that all sensors may simultaneously detach from the brake pedal, and thus all sensors may return similar, but erroneous, brake pedal displacement measurements.

In accordance with an exemplary embodiment, a fail state is determined by a brake pedal sensor test algorithm that is at least partially based on and/or accounts for various parameters and/or measurements including whether the brake pedal is "valid" or "good", deviation of brake pedal measurements (e.g., amount of and/or time of displacement), deviation of brake pedal measurements unlikely to be generated by human input, random signal errors, deflection time, and the like, and/or combinations of the same.

In embodiments where the brake pedal includes two or more sensors, a good or valid indication is a determination by the pedal test algorithm that the respective brake pedal sensors are in agreement with each other and are within a valid range. In order to have agreement with one another, each brake pedal sensor should indicate that the brake pedal deflection amount (distance traveled) is the same or nearly the same, or otherwise within an acceptable range. For example, when the brake pedal sensors report different brake pedal displacements, then the pedal test algorithm may determine that the pedal is not good or valid. Moreover, a brake pedal controller may also be configured to check if a calculated deflection time based on sensor readings is the same or nearly the same, or otherwise within an acceptable range.

In various embodiments, the system detects that the sensor has been commanding braking a certain period of time at a certain level, for example, 10 minutes at 75% of a maximum braking level. Though the brakes would initially be pressurized to the indicated amount (75%), the system would halt any braking command after the certain time period (10 minutes), realizing that the brake command is an error and not intentional. In the event of a fail state, the control system may alert a notification system to provide notification of the fail state to an appropriate person (e.g., the crew) and/or system. Once a brake pedal sensor fail state is indicated, various known schemes for addressing the failure, such as those noted above, may be implemented.

In various embodiments, if desired, the system may also provide notification that the brake pedal sensor is in a pass state, so that the pilot or co-pilot may, for example, quickly verify that the brake pedal sensors are functioning properly.

In various embodiments, a brake pedal is at rest in a normal (natural) state. Typically, this rest point is a non-braking position at the end of the sensor's travel. Stated another way, the default position of the brake pedal is at 0% deflection, and no braking is commanded at this position. In addition, there is typically a tolerance or "deadband" near the rest point to assure important safety interlocks are maintained.

For example, aircraft brake pedals are generally configured to deflect from no deflection to full deflection or, stated otherwise, from 0% to 100%. Often, for example because of various tolerances and/or mechanical, electrical and sensor noise, a deadband exists and may be accounted for by the system. For example, a member of the crew may inadvertently bump or briefly deflect a brake pedal a short distance. A deadband suitably accounts for this deflection, and thus the brakes will not be applied. In various embodiments, the deadband may range from about 0% to about 20% of brake pedal deflection, though in various embodiments, any suitable ranges may be used.

Similarly, the system may also account for various safety interlocks that may be active within the deadband. For example, a main brake hydraulic shutoff value may be controlled by brake pedal controller hardware. If a brake pedal is valid, and is deflected outside of the deadband (for example, an amount greater than 20% of pedal deflection), then the main brake hydraulic shutoff value is opened and hydraulic pressure is transmitted to one or more brake servo valves, which are typically controlled by software. If the brake pedal is not valid and/or if the brake pedal is deflected only within the deadband, then the main brake hydraulic shutoff valve is not opened, and no pressure is transmitted to the brake servo valves. In this manner, the brake servo valves and/or the brake servo valve control software may be subject to less rigorous design and testing requirements (allowing significant cost savings), due to the presence of the brake pedal hardware interlock.

In general, the control system may be configured to assess brake pedal sensor measurements to look for a "non-conforming" input state. For purposes of this disclosure, a non-conforming input state may be determined at least in part from a set of brake pedal sensor measurements unlikely to have been generated due to human input at a brake pedal. Conversely, a "conforming" input state may be determined at least in part from a set of brake pedal sensor measurements likely to have been generated due to human input at a brake pedal. For example, a non-conforming input state may be determined based on a periodic set of brake sensor measurements (e.g., a sine wave, a square wave, a saw wave, a regular impulse, and the like). Stated another way, it is unlikely that a human could depress and release a brake pedal with sufficient accuracy and/or precision to generate a set of measured brake pedal displacements which resembles a periodic signal, for example a sine wave. Similarly, it is unlikely that a human could depress and release a brake pedal rapidly enough to generate a set of measured brake pedal displacements having a frequency greater than approximately 4 Hertz, as such rapid leg movement may be extremely difficult and/or impossible to generate, depending on the frequency. It is also unlikely that a human could depress the brake pedal at a consistent, regular interval, for example every 3.73 seconds. Additionally, due to undesired electrical shorting or other coupling, a brake pedal sensor measurement may be skewed or otherwise corrupted, contaminated, or modified by an external signal, for example a 60 Hz AC "hum", a 2.5 kHz excitation signal delivered to a brake pedal sensor, and the like. A non-conforming input state may be determined based at least in part on such sensor measurement degradation.

Moreover, in various embodiments, a non-conforming input state may be determined at least in part based on brake sensor measurements which indicate changes in brake pedal displacement unlikely and/or impossible to achieve given the mechanical characteristics of a particular brake pedal. For example, it is unlikely that a brake pedal, which may have a distance from zero displacement to full displacement of several inches or more, may be mechanically capable of traveling to full displacement and back again to zero displacement at a high rate, for example ten times per second. It is also unlikely that a brake pedal may be mechanically capable of travelling from zero displacement to full displacement in a short amount of time, for example one one-hundredth (1/100) of one second. Stated another way, the rate of change in displacement of a brake pedal may have a maximum slope, due to mechanical constraints of the brake pedal assembly and/or other factors. In an embodiment, a non-conforming input state may be determined at least on part based on a rate of change in brake pedal displacement exceeding one percent (1%) of total displacement in one four-hundredth (1/400) of one second (1%/0.0025 second). However, any suitable rate of change and corresponding slope may be used.

In addition to determining a non-conforming input state based on unexpected changes in brake pedal sensor measurements, a non-conforming input state may be also be determined based on a lack of expected changes to brake pedal sensor measurements. For example, it is unlikely that a human could depress and hold a brake pedal to a precise displacement for an extended period of time. For example, it is unlikely that a human could depress a brake pedal to 47% of full displacement, and then hold the brake pedal very nearly at 47% of full displacement for an extended period of time, as muscle fatigue, movements of other parts of the body, human responses to perceived changes in braking conditions, and the like, may cause the amount of force a person applies to a brake pedal (and thus the displacement of the brake pedal) to vary.

In various embodiments, various deviations of the brake pedal deflection amount and/or the length of the deflection time may be factors in determining a pass state or a fail state.

For example, as described in more detail below, the control system may be configured with a predetermined level of allowed deviation in the brake pedal deflection amount, and may take various factors into account when determining whether a deviation is beyond the predetermined level of allowed deviation. For example, the deflection time should be long enough that it is unlikely that a crew member (pilot or co-pilot) is intentionally depressing the brake to request braking, such as performing standard tests, inflight checks, and the like.

In some embodiments, when determining whether a brake pedal sensor is in a fail state, the control system may also consider parameters such as the time of deflection, and the varying resistance of the brake pedal as the brake pedal is deflected. For example, generally, as the brake pedal deflection amount increases, the brake pedal's resistance to further deflection also increases. Therefore, the higher the brake pedal deflection amount, the more difficult it will be for an operator to maintain a constant pedal force. Because of the increasing pedal resistance, it is generally not feasible for an operator to depress a brake pedal at a steady position beyond a certain period of time and/or with a precise pedal force. In other words, the greater the deflection, the greater the difficulty in maintaining the deflection for an extended period of time.

Thus, at a low deflection and corresponding low pedal resistance, an acceptable maximum deflection time corresponding to a non-fail state may be relatively long (e.g., five minutes, ten minutes, and the like), while at a higher pedal deflection and corresponding higher pedal resistance, an acceptable maximum deflection time corresponding to a non-fail state may be shorter (e.g., thirty seconds, one minute, and the like). Stated otherwise, in determining whether a fail state exists, the acceptable amount of deflection time may be generally inversely proportional to the amount of deflection.

As indicated above, in various embodiments, as the brake pedal measurement is conducted, some level of random error, ambient "noise" or inadvertent "human noise" may exist or occur, and the control system is suitably configured such that this noise is not interpreted as a failed measurement and/or an actual change in pedal displacement. For example, an acceptable range of noise may be about ±2% of deviation.

In an embodiment, the control system may also compensate for some amount of human inability to maintain a precise and constant level of brake pedal deflection amount beyond a certain deflection time. In this regard, if the brake pedal deflection amount is maintained at a particular deflection outside the deadband (in the example above, from about 20% to less than about 100%), equal to or longer than an acceptable deflection time (e.g., longer than a human is likely able to maintain a certain level of accuracy and/or precision), and with a deviation below the predetermined level from the deflection point (e.g., with too little deviation), one or more brake pedal sensors may be determined to be in the fail state. In contrast, if the brake pedal deflection amount is held in the non-zero state for less than an acceptable deflection time and/or if the brake pedal deflection amount periodically deviates from a particular deflection point by an amount greater than a predetermined level, one or more brake pedal sensors may be determined to be in the pass state.

In an embodiment, brake pedal deflection sensor measurements may be represented as a bit pattern. For example, using a 10 bit analog to digital converter, a brake pedal deflection measurement reported by a brake pedal sensor may have the form of "01 1001 0101." Noise may be represented by one or more digits in the pattern, the most significant bit being the first (leftmost) bit and the least significant bit being the last (rightmost) bit.

For example, the brake pedal deflection measurement may take the form of "01 1001 01XX," where the two least significant bits (X) are considered to vary as a result of expected noise ("random", "systemic", and the like), and thus are not used to assess deviations in brake pedal sensor measurements. The remaining portion (the leftmost eight bits) of the bit pattern is monitored for changes and used to determine whether the deviation is acceptable. Thus, while changes in the rightmost two bits may be disregarded as noise, if the left eight bits of the bit pattern vary sufficiently (e.g., indicating human input), a pass state is indicated. Similarly, in this example, if the leftmost 8 bits of the bit pattern fail to vary sufficiently for at least a specified period, for example, 10 seconds, a problem with a brake pedal sensor is indicated and a fail state is declared. In various embodiments, the minimum and/or maximum level of bit change needed to indicate a pass or fail state may change (e.g., based on tolerance dictated by the conditions).

Changes in brake pedal sensor deflection measurements may also be represented as analog signals and/or percentages. For example, if a change in measured brake pedal deflection reported by a brake pedal sensor varies by less than 2% during a predetermined period of time during a period when there is no reason for deflection for such a period of time (e.g., when flying, parked, etc.), a fail state is declared (since a human likely cannot maintain a sufficiently steady displacement). In another example, if the reported change in brake pedal displacement varies by less than 5% during a predetermined period of time, a fail state is declared. In various embodiments, other suitable ranges of variation may be selected in order to account for human input characteristics, system noise, sensor sensitivity, aircraft braking system conditions, and the like.

As one skilled in the art should understand, the system may be configured to consider the above parameters alone or in various combinations. For example, in various embodiments, the system may fail a brake pedal if: (i) the pedal measurement is good; and (ii) the brake pedal deflection is outside the deadband, and (iii) the brake pedal deflection has deviated less than a predetermined level (e.g., less than would be expected from human input), and (iv) the brake pedal deflection has been maintained beyond a certain time limit (e.g., longer time than would be expected from human input). In contrast, the system may not fail a brake pedal if: (i) the pedal measurement is good; and (ii) the brake pedal deflection is outside the deadband, and (ii) the brake pedal deflection deviates above a predetermined level (e.g., a level of deviation that would be expected from human input), or (iii) the brake pedal deflection deviates less than a predetermined level but the brake pedal deflection has not been maintained beyond a certain time limit (e.g., a sufficiently short time such that it could potentially result from human input).

In various other embodiments, the system may fail a brake pedal if: (i) the pedal measurement is good; and (ii) the brake pedal control system determines that brake pedal sensor measurements indicate a non-conforming input state. In contrast, the system may not fail a brake pedal if: (i) the pedal measurement is good; and (ii) the brake pedal control system determines that brake pedal sensor measurements indicate a conforming input state.

As one skilled in the art will appreciate, a brake pedal may be failed based at least in part on various other considerations, for example if the pedal measurement is not valid or good, if the brake pedal suffers a mechanical malfunction, and the like.

Turning now to FIG. 1 and in accordance with an exemplary embodiment, a system 10 for monitoring brake pedal sensor failure is illustrated. The system 10 comprises a control system 12, which is in communication (e.g., electrically, optically, and/or the like) with a notification system 14 and a brake pedal sensor system 16. The brake pedal sensor system 16 comprises a brake pedal sensor coupled with each brake pedal, though in various embodiments, one or more additional brake pedal sensors may also be coupled with each brake pedal.

In an embodiment, the control system 12 comprises a software and/or hardware computer-based system configured with a brake pedal sensor test algorithm to analyze signals received from the brake pedal sensor system 16 and to provide feedback, for example to the flight crew, through the notification system 14. In various embodiments, the notification system 14 includes alerting components for providing notifications (for example to the operators of the aircraft, to the avionics systems, and the like) of a fail state of the brake pedal sensor. Additionally, in an embodiment, incidents of any alerts noted above may be recorded in memory for later retrieval within built-in test equipment (BITE) of the control system 12.

Figure 2:
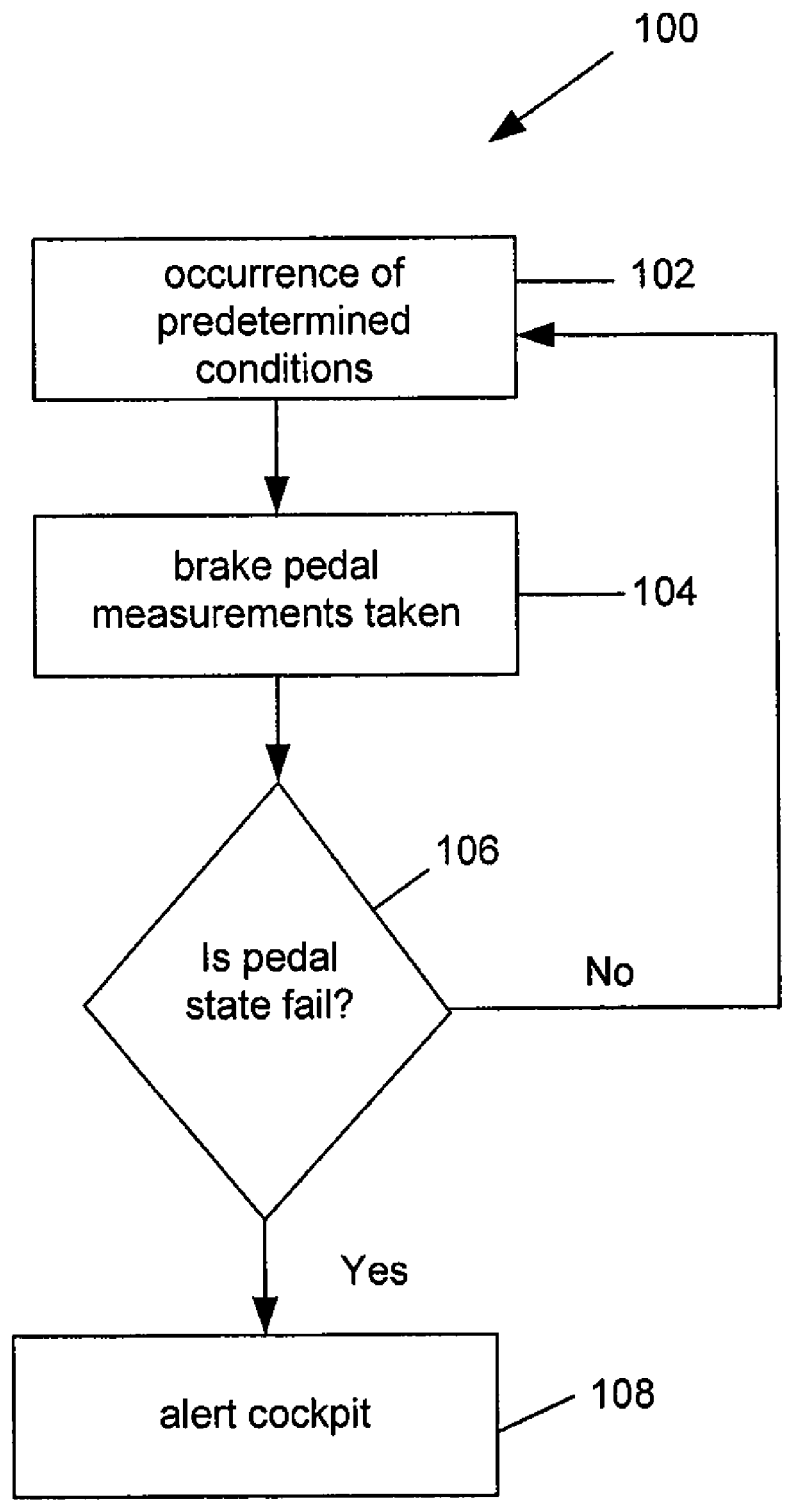
FIG. 2 illustrates a flow diagram performed by the exemplary system of FIG. 1 in accordance with an embodiment.

In accordance with an exemplary embodiment, FIG. 2 illustrates an exemplary flow diagram 100 performed by the system 10 shown in FIG. 1. In this embodiment, upon occurrence of at least one of certain predetermined conditions (step 102) (for example, at a regular interval, in preparation for landing, in response to a test request from an operator, and the like), the brake pedal sensor system 16 takes brake pedal displacement measurements for each brake pedal via the brake pedal sensor or sensors (step 104) using the brake pedal sensor test algorithm. The control system 12 determines whether the brake pedal measurement indicates the brake pedal sensor is in a fail state (step 106). If the state is a fail state, then there is an error or other problem with the brake pedal sensor or sensors (e.g., sensor has detached from its mounting point and is erroneously indicating a braking command) or is otherwise not functioning properly. If the brake pedal sensor is not in a fail state, then the brake pedal sensors or sensors are considered to be functioning properly and, upon occurrence of at least one of the aforementioned predetermined conditions (step 102), the process repeats.

Figure 3:
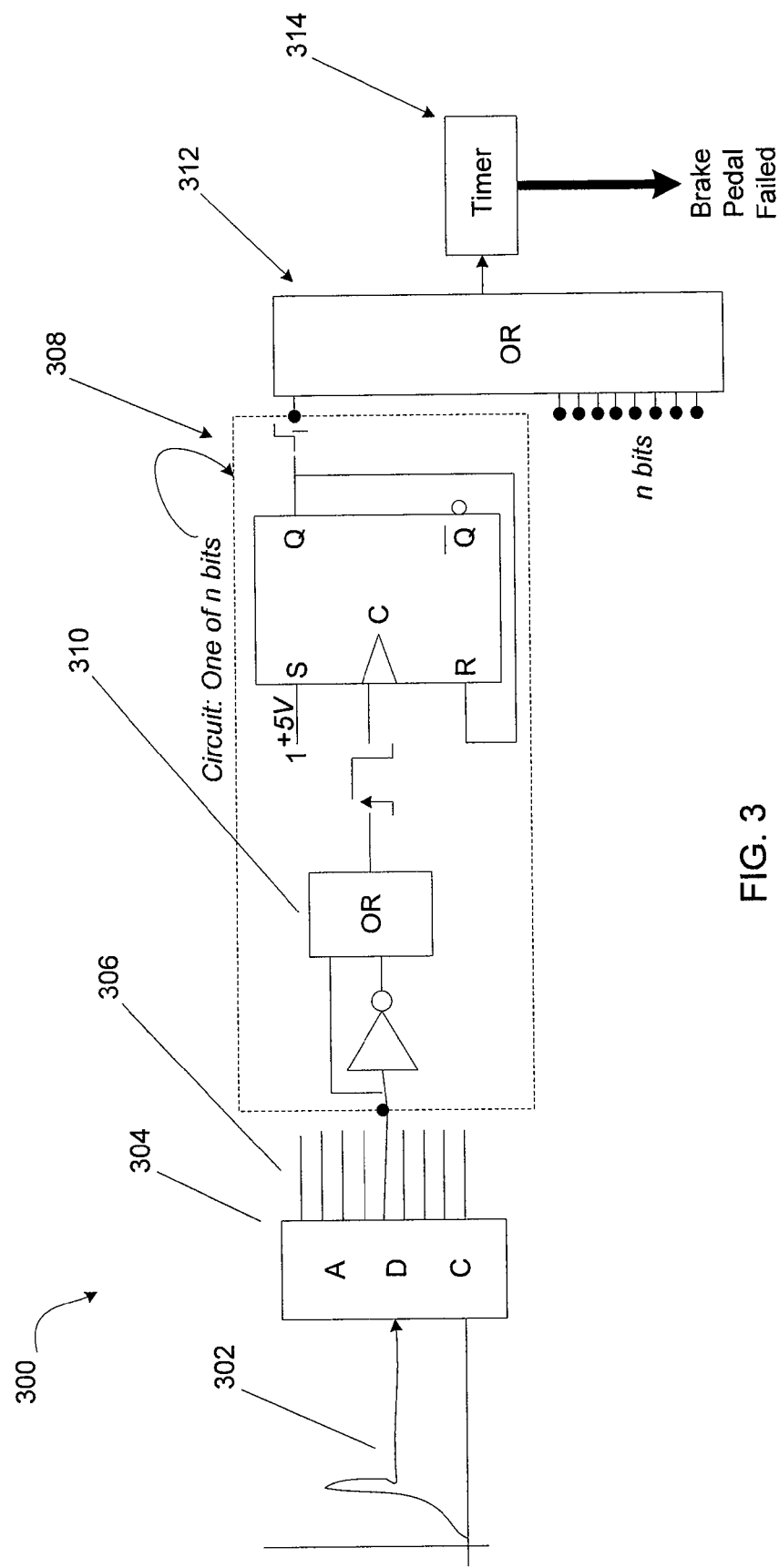
FIG. 3 illustrates a brake sensor test circuitry diagram in accordance with an embodiment.

With reference now to FIG. 3 and in accordance with various exemplary embodiments, a brake pedal sensor test circuit 300 is presented. A brake pedal sensor signal 302 is input to an Analog to Digital Converter (ADC) 304, and a series of bits 306 is output by ADC 304. Each of the bits comprising bit series 306, except the least significant noise/tolerance bits (such as those described above), are suitably input to a control circuit 308. Bit series 306 and the corresponding negatives are input into an OR gate 310 of control circuit 308, and if a bit transitions (from low to high OR high to low) the RS flip flop is positive edge triggered to output the value on S as TRUE (logic one). Each of the RS flip flop outputs are input to an OR gate 312. If any bit changes state, the value of OR gate 312 is TRUE and a timer 314 is reset to begin counting again toward a predetermined limit (e.g., a predetermined time of sufficient length to be unlikely to result from human input). If the pedal input does not change any of the bit states before the timer reaches the predetermined limit, then the timer triggers a brake pedal failed flag.

Benefits, other advantages, and solutions to problems have been described herein with regard to specific embodiments.

However, the benefits, advantages, solutions to problems, and any elements that may cause any benefit, advantage, or solution to occur or become more pronounced are not to be construed as critical, required, or essential features or elements of the invention. The scope of the invention is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for determining a state of a brake pedal sensor, the method comprising:
   receiving, at a control system, at least two brake pedal measurements from the brake pedal sensor, wherein each brake pedal measurement comprises a brake pedal deflection amount;
   determining, by the control system, the state of the brake pedal sensor based upon the at least two brake pedal measurements;
   providing a notification of the state;
   wherein the determining the state of the brake pedal sensor based upon the at least two brake pedal measurements comprises:
      calculating a length of time a brake pedal has been displaced;
      calculating a mean value of the brake pedal deflection amount over the length of time;
      calculating a deviation from the mean value of the brake pedal deflection amount; and
      identifying a fail state responsive to the deviation being less than a displacement threshold, and responsive to the length of time exceeding a displacement time threshold.

2. The method of claim 1, wherein the displacement threshold is two percent.

3. The method of claim 1, wherein the at least two brake pedal measurements indicate a non-conforming input state.

4. The method of claim 1, wherein the displacement time threshold is one minute.

5. The method of claim 1, further comprising disregarding braking commands from a brake pedal associated with the brake pedal sensor responsive to a determination that the brake pedal sensor is in a fail state.

6. The method of claim 1, wherein a brake pedal measurement is represented as an analog signal.

7. The method of claim 1, wherein a brake pedal measurement is represented as a bit pattern.

8. The method of claim 1, wherein the brake pedal is displaced outside a deadband located between about 0 percent to about 20 percent of brake pedal displacement.

9. A brake pedal sensor test system, comprising:
   a brake pedal sensor configured to measure a brake pedal deflection amount;
   a control system in communication with the brake pedal sensor, wherein the control system is configured to assess brake pedal measurements to determine a presence of a non-conforming input state;
   a notification system in communication with the control system, wherein the notification system provides an indication responsive to the determination,
   wherein the control system determines the presence of the non-conforming input state by a method comprising:
      calculating a length of time a brake pedal has been displaced;
      calculating a mean value of the brake pedal deflection amount over the length of tine;
      calculating a deviation from the mean value of the brake pedal deflection amount; and
      identifying the presence of the non-conforming input state responsive to the deviation being less than a displacement threshold, and responsive to the length of time exceeding a displacement time threshold.

10. The system of claim 9, wherein the brake pedal deflection amount is represented as an analog signal.

11. The system of claim 9, wherein the brake pedal deflection amount is represented as a bit pattern.

12. The system of claim 9, wherein the brake pedal deflection amount is represented as a percentage.

13. The system of claim 9, wherein the control system is configured with a brake pedal test algorithm.

14. An article of manufacture including a tangible, non-transitory computer readable storage medium having instructions stored thereon that, in response to execution by a control system, cause said control system to perform operations comprising:
   receiving, by the control system, at least two brake pedal measurements from the brake pedal sensor, wherein each brake pedal measurement comprises a brake pedal deflection amount;
   determining, by the control system, the state of the brake pedal sensor based upon the at least two brake pedal measurement;
   providing, by the control system, a notification of the state;
   calculating, the control system, of time the brake pedal has been displaced;
   calculating, by the control system, a mean value of the brake pedal deflection amount over the length of time;
   calculating, by the control system, a deviation from the mean value of the brake pedal deflection amount; and
   identifying, by the control system, a fail state responsive to the the deviation being less than a displacement threshold, and responsive to the length of time exceeding a displacement time threshold.

* * * * *

UNITED STATES PATENT AND TRADEMARK OFFICE
CERTIFICATE OF CORRECTION

| | |
|---|---|
| PATENT NO. | : 8,280,603 B2 |
| APPLICATION NO. | : 12/400139 |
| DATED | : October 2, 2012 |
| INVENTOR(S) | : Eric D. Cahill |

Page 1 of 1

It is certified that error appears in the above-identified patent and that said Letters Patent is hereby corrected as shown below:

In Column 10 Line 51, after "calculating," please insert therefor --by--

In Column 10 Line 51, after "system," please insert therefor --a length--

Signed and Sealed this
Twenty-seventh Day of November, 2012

David J. Kappos
*Director of the United States Patent and Trademark Office*